Oct. 21, 1952     R. H. SAMDAHL     2,614,860
AUTOMOTIVE TRAILER HITCH
Filed June 7, 1949     2 SHEETS—SHEET 1
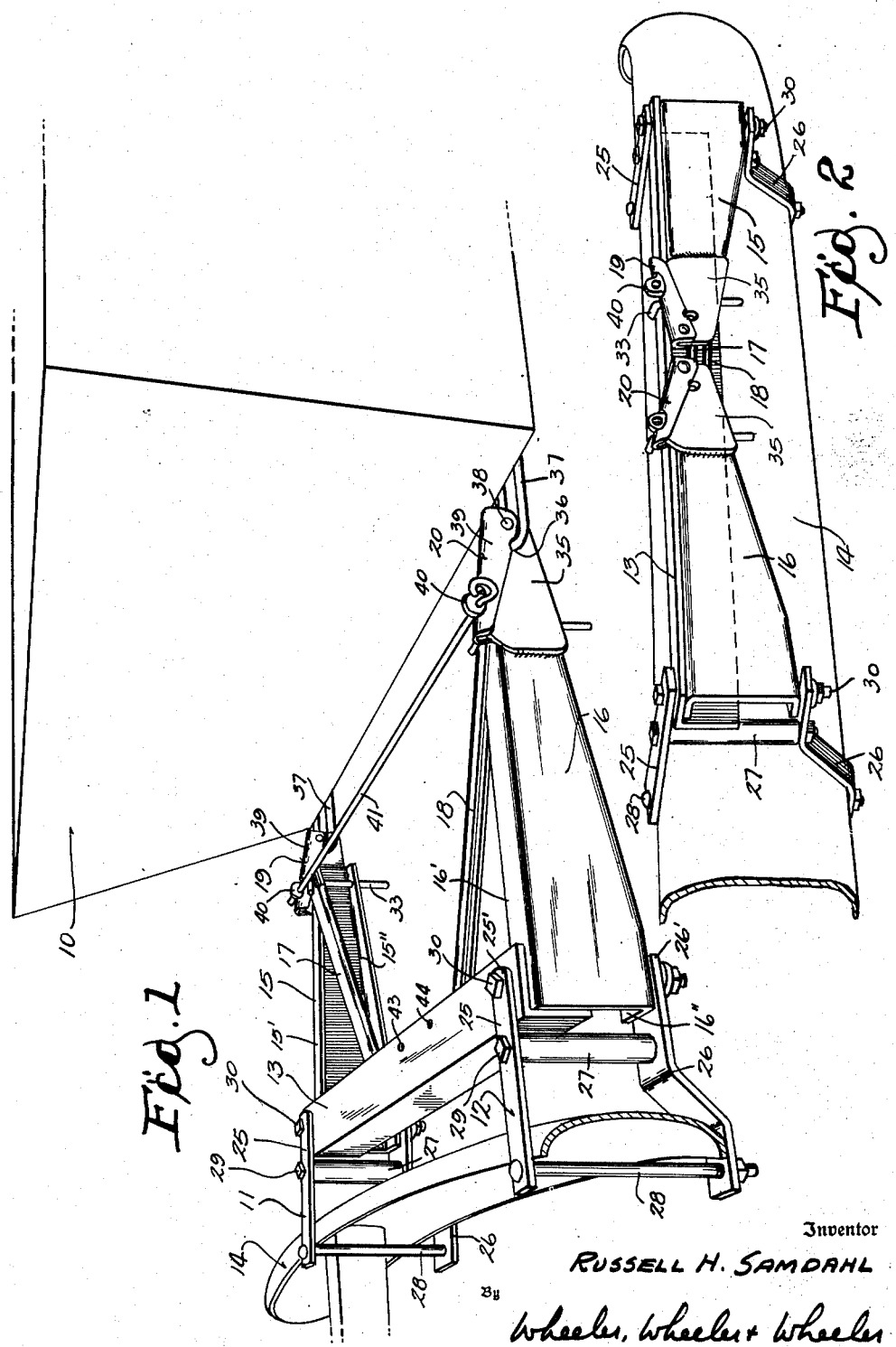
Inventor
RUSSELL H. SAMDAHL
By Wheeler, Wheeler & Wheeler
Attorneys

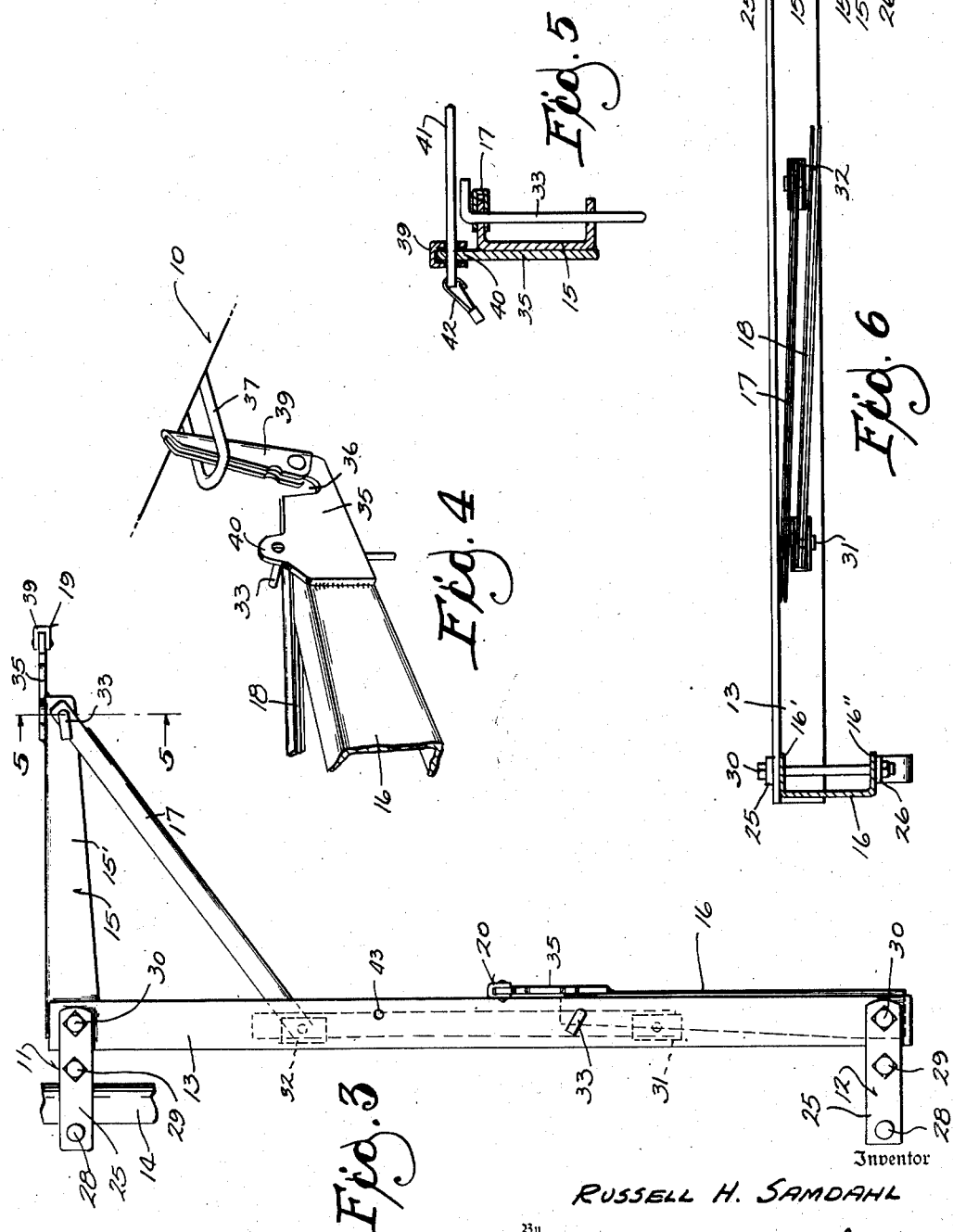

Patented Oct. 21, 1952

2,614,860

UNITED STATES PATENT OFFICE 2,614,860

AUTOMOTIVE TRAILER HITCH

Russell H. Samdahl, Black River Falls, Wis.

Application June 7, 1949, Serial No. 97,600

5 Claims. (Cl. 280—33.14)

My invention relates to improvements in automotive trailer hitches.

The object of my invention is to provide a hitch for attachment between the rear portion of the automotive vehicle and a trailed load whereby to attain a safe hitch.

A further object of my invention is to provide a trailer hitch attachment for the rear bumper or other rearward structural member of an automotive vehicle, which attachment may remain in attached but folded position even though my attachment provides lengthy towing connections.

Another object of my invention is to provide a trailer hitch which may support as well as provide draft attachment to a load—conveniently stowable braces being included in my hitch.

Another object of my invention is to provide an improved latch lock connection between a trailer hitch and a trailer hitch load.

In the drawings:

Figure 1 is a perspective of my unfolded hitch installed upon the bumper of an automobile and attached to the stern of a rowboat, the bumper being fragmentarily shown with a portion in section and the stern of the rowboat being a fragmentary view.

Figure 2 is a perspective of my trailer hitch in folded position upon a fragmentary section of an automotive bumper.

Figure 3 is a plan view of my hitch, one tractor arm and its latch and brace being shown in extended position and the other tractor arm, latch and brace being shown in folded position—fragment of a bumper being shown with a set of bumper attaching clips at one end of my hitch.

Figure 4 is a perspective of my boat attaching latch in open position with a load hanger staple partially engaged by the latch in readiness for a completed latch operation.

Figure 5 is a section on line 5—5 of Fig. 3, but showing my latch lock rod in position.

Figure 6 is an elevation of my hitch, the view being one taken forwardly with my draft bars in vertical section and my draft bar braces in folded position.

Like parts are designated by the same reference characters throughout the several views.

My hitch is especially useful where such a trailer load as a rowboat 10 supported upon a single wheel is to be attached to the rear of an automobile or other automotive vehicle, somewhat in accord with the disclosure in my U. S. Letters Patent 2,283,648, issued May 19, 1942, but it will be understood from the following description that my hitch may be used for a wide variety of towing service.

In the following description of my invention it will be understood that in referring to elements in view as being forward and rearward, that I am using these terms in accord with rearward and forward motion of the automotive vehicle to which my hitch is attached.

The principal structural elements of my improvement hitch include a pair of bumper clamps 11—12 to afford attachment for beam 13 behind bumper 14 or other rearward structural element of an automotive vehicle. Two retractible draft bars 15 and 16 and their respective braces 17—18 are movable to support latches 19 and 20 in retracted or extended position as will be hereinafter described.

Each of the brackets 11—12 includes a top plate 25 and a bottom plate 26 spaced apart by a tubular spacer 27 but snugly pulled toward one another by bolts 28 so that the bracket is held firmly in position upon bumper 14.

Bolts 29 through the tubular spacers and through the plates hold the bracket assembly rigidly with extending, rearward, hinge mounts 25' and 26'.

In stout, housing and frame forming position between the hinge mounts 25' I provide beam 13, which is preferably in the form of an angle member, as shown clearly in the drawings. The beam rests upon forward ends of draft bars 15 and 16, which are swingable about draft bolts 30 extending through the draft mounts, through the beam 13 and through side webs 16' and 16" of the draft bars—these bars being preferably formed in channel tapered shape, as shown.

It will be apparent from the identification of the structural elements thus far described that the draft bars 15 and 16 may be oscillated about their draft bolts 30 from a retractive position as shown in Fig. 2, to the extended position shown in Fig. 1.

Likewise extendable and retractible to and from housed position within the angle of the beam 13 I provide braces 17—18 pivotly supported in brackets 31 and 32 respectively welded or otherwise secured to the beam as shown most clearly in Fig. 6 where the braces are in folded position under the beam. As there shown, the free ends of the braces are bifurcated so that when they are swung to extended position, as shown most clearly in Fig. 3, this "free" end may embrace web 15' or 16', which is perforated to receive a brace pin 33, which is manually insertable through a hole near the end of the bifurcations and through the perforated web. It will be noted that the brace pin 33 has an L-shaped head for purposes hereinafter to be described. When the draft bars 15—16 and their respective braces 17—18 are in extended position with the brace pins 33 interlocking their rearward ends, my entire draft or towing portion of my hitch is stoutly and rigidly extended to receive the load, as will be now described.

At the rearward end of each draft bar is a projecting rod-receiving, hooked latch member 35 having a slot 36 to receive a U-shaped rodlike tow bar 37, as shown most clearly in Figs. 1 and 4. At the rearward end of the hook of my latch member 35 I pivotally mount at 38 a channel shaped latch keeper 39, the channel groove of which is wide enough to receive an upwardly extending and apertured latch keeper lock 40. This latch keeper lock is insertable through a hole through the latch keeper 39, as shown in Fig. 1, when the latch 19 or 20 is closed so as to hold the tow bar 37 in the slots 36.

With both latch keepers 39 in locking position I provide a latch lock rod 41 to extend not only through one of the latch locks 40 but through both of them, as shown in Fig. 1, with a result that this latch keeper lock rod overlaps the heads of the brace pins 33 to prevent their accidental release from brace holding position. Therefore, with one locking member I assure the safety of bracing and latch-locking position of my hitch devices. At the end of my locking rod 41 I have installed a snap latch 42, as shown clearly in Fig. 5. This snap lock may be replaced by a padlock if desired.

Assuming that my complete hitch has been in towing relation to a rowboat, as shown in Fig. 1, I release the tow load 10 by taking out snap lock 42 from its position on the end of lock rod 41. I then withdraw the rod 41 so as to permit swinging movement of latch keepers 39, as shown in Fig. 4. The tow bars 37 are then removable from latch members 19 and 20 and the rowboat or other load 10 may be separated from my hitch. Lock rod 41 previously having been removed, brace pins 33 may be pulled from their respective braces and from the webs of draft bars 15—16, whereupon braces 17 and 18 may be swung to the position shown in dotted lines in Fig. 3, and as shown in full lines in Fig. 6. This clears the way for swinging movement of the draft bars 15 and 16 to their retracted positions, as shown in Figs. 2 and 3, where they may be retained by inserted brace pins 33 in the respective holes 43 and 44 in beam 13. These holes are inserted in the beam in proper position to match with holes in the webs of the draft bars provided for the reception of the brace pins when my hitch is in extended position. Thus in retracted position, the draft bars hold the braces and the brace pins hold the draft bars to make a snug fold assembly.

From the above description it will be apparent that I have provided an exceedingly sturdy, safe and reliable hitch.

Obviously a big advantage flows from the extensibility of my hitch. Many types of trailable loads are of such configuration and so difficult to handle in close proximity to an automobile that the hitch must provide additional space. Yet the hitch must not be bulky, or extend any material distance behind the vehicle when no trailing load is hitched thereto. My retractable hitch fulfills all requirements in these respects and I have found that the folded draft bars and my beam complement the bumper so as to add to rather than detract from the utility and attractiveness of the trailerless vehicle.

I claim:

1. A hitch including spaced swingably mounted draft bars provided with attaching means to connect said bars to a vehicle, a beam extending between the attaching means, said bars being swingable toward each other to retracted position along said beam and away from each other to extended position, and latches on the draft bars positioned to releasably receive a tow when the bars are extended.

2. A hitch for a vehicle having a bumper horizontally disposed across the vehicle and including a beam to provide a protected zone parallel to the bumper spaced apertured swingable draft bars attached to the beam at spaced points and provided with apertured braces extending to the bars and provided with swingable attachment to the beam; brace pins manually receivable in the apertures to lock the braces to the bars; latches having tow keepers and secured to the draft bars in tow receiving position when the braces are locked by said pins, each latch being apertured to receive a lock rod in position to lock the latch keeper in tow holding position; and a lock rod receivable in said apertures and thereby positioned over said brace pins whereby simultaneously to lock said latch keepers and said pins in tow holding and in bracing positions respectively.

3. In a hitch for a vehicular trailable load, a draft bar and beam foldable upon one another and provided with connections for attachment to vehicle and load, a brace permanently swingably connected to one of said bar or beam elements and provided with means manually connectable to the other in bracing relationship whereby to hold the bar and beam at a predetermined angle to one another, said brace being positionable swingably to a position between the beam and bar when they are in folded position.

4. A hitch including spaced swingably mounted draft bars provided with attaching means to connect said bars to a vehicle, a housing-like beam provided with spaced pivotal connections to receive said bars and provide the swingable mounting therefor, said bars being swingable toward each other to retracted position along said beam and away from each other to extended position, latches on the draft bars positioned to releasably receive a tow when the bars are extended, and braces between said bars and said beam and pivotally mounted to the beam, said braces being swingable to overlapping position between the draft bars.

5. A hitch for a vehicle having a horizontal bumper, said hitch including a housing-like beam secured in approximately parallel relationship to the bumper and provided with spaced horizontally swingable draft bars thereon shaped to complete the housing when the draft bars are swung to a retracted position, and a brace secured swingably to the beam and adapted for attachment to one of said bars whereby alternatively to be receivable in the housing or extended diagonally to the draft bar therefrom.

RUSSELL H. SAMDAHL.

REFERENCES CITED

The following references are of record in the file of this patent:

UNITED STATES PATENTS

| Number | Name | Date |
|---|---|---|
| 1,478,041 | Lorenz | Dec. 18, 1923 |
| 2,089,400 | Morris | Aug. 10, 1937 |
| 2,179,070 | Weise | Nov. 7, 1939 |
| 2,283,436 | Hawkins | May 19, 1942 |
| 2,401,183 | Pool et al. | May 28, 1946 |
| 2,481,685 | Rogers | Sept. 13, 1949 |